United States Patent [19]

Anderson et al.

[11] Patent Number: 5,490,430
[45] Date of Patent: Feb. 13, 1996

[54] OPTICAL TORQUE SENSOR UTILIZING CHANGE IN REFLECTANCE GRATING LINE SPACING

[76] Inventors: Philip M. Anderson, 37 Winding Way, Madison, N.J. 07940; John W. Curran, 11 Robert Dr., Lebonan, N.J. 08833

[21] Appl. No.: 112,375

[22] Filed: Aug. 27, 1993

Related U.S. Application Data

[63] Continuation-in-part of Ser. No. 882,948, May 14, 1992, abandoned.

[51] Int. Cl.$^6$ ........................................................ G01L 3/00
[52] U.S. Cl. ............................................ 73/862.324; 73/800
[58] Field of Search ................................. 73/800, 862.324, 73/862.326; 356/28.5, 35.5

[56] References Cited

U.S. PATENT DOCUMENTS

| | | | |
|---|---|---|---|
| 3,688,570 | 9/1972 | Burke, Jr. .................... | 73/862.324 |
| 3,871,215 | 3/1975 | Pratt, Jr. et al. ............... | 73/862.324 |
| 4,525,068 | 6/1985 | Mannava et al. ................. | 356/35.5 |
| 4,939,368 | 7/1990 | Brown .......................... | 356/35.5 |
| 5,038,616 | 8/1991 | Schneider et al. ................ | 73/660 |

Primary Examiner—Richard E. Chilcot, Jr.
Assistant Examiner—R. Biegel
Attorney, Agent, or Firm—Ernest D. Buff

[57] ABSTRACT

Torque on a rotating or stationary shaft is measured by an apparatus that includes a light source for emitting light along a light path; a reflection grating fixed to the shaft along the light path reflecting and diffracting the light; and a light detector having a plurality of light detecting elements for receiving the reflected and diffracted light. Torque on the shaft produces a change in the grating spacing of the grating, which in turn produces a change of diffraction angle of the reflected light, thereby causing a different element of the light detector to receive the light.

11 Claims, 7 Drawing Sheets

OPTICAL TORQUE SENSOR UTILIZING CHANGE IN REFLECTANCE GRATING LINE SPACING

CROSS-REFERENCE TO RELATED APPLICATIONS

This application is a continuation-in-part of U.S. application Ser. No. 882,948, filed May 14, 1992, now abandoned.

BACKGROUND OF THE INVENTION

1. Field of the Invention

The present invention relates to the field of torque measurement; and more particularly, to means and method for determining the amount of torque that occurs in a stationary or rotating shaft.

2. Description of the Prior Art

When torque is applied to a shaft, two principal lines of stress are induced along helical lines which are orthogonal to each other on the surface of the shaft. Various different methods of torque measurement have been available, but no method has been totally satisfactory. Two common methods of measuring torque, strain gage and optical, are well described in the literature. See "Sensor and Analyzer Handbook," by Harry Norton, Prentice Hall, 1982, pp 131–142.

Torque is most accurately measured by bonding strain gages in a cross arrangement along the helical lines of compression and tension. The strain gages are electrically configured in a balance-bridge and coupled to measuring electronics via slip rings or noncontacting rotary transformers. Generally, these cross arrangements are difficult to implement and usually require custom installation. In another variation, disclosed by Gurenko and Krutkis in Soviet patent 2,493,268, a light source is used to couple the gage signal to a stationary photodiode.

In optical torque transducers, light beams, code patterns and light sensors convert the differential angular displacement between two positions on a shaft, due to applied torque, into an output signal. Specifically, identical patterns made of light reflecting strips are arranged circumferentially around the shaft at two locations. The patterns are illuminated by laser diodes and the reflected light is sensed by photocell. The output of each photocell is a pulse train and the phase difference between them is a measure of the torque. In a similar device, by Kawamoto, U.S. Pat. No. 4,767,925, a pair of light emitting and receiving elements produce an output depending on the amount of light transmitted due to the relative rotation of two slotted disks. Levine in U.S. Pat. No. 4,433,585 discloses passing a beam of light through two diffraction gratings placed at different locations along a shaft and sensing the phase of the two resulting beams. These are not robust devices as they requires exact alignment. U.S. Pat. No. 5,001,937 to Bechtel et al. discloses an optically based torsion sensor that measures the phase displacement between two bands of alternating high and low reflectivity regions. A major drawback of this device is its dependence on the initial alignment of the two bands. In addition, minor differences in the rise time of detecting electronics will cause serious errors in measurement. U.S. Pat. No. 4,525,068 to Mannava et al. discloses a torque sensor utilizing optical Doppler measurements. Since Doppler measures velocity only, this device suffers from a very serious shortcoming in that it must infer torque from changes in instantaneous rotational velocity of two different sections of a shaft.

Two optical methods for measuring strain of an object are noteworthy. U.S. Pat. No. 4,939,368 to Brown discloses an optical grating to measure strain in a stationary object. The device is complicated in that it requires two frequencies of light and has no provision for measuring a moving object such as a rotating shaft U.S. Pat. No. 4,432,239 to Bykov discloses an apparatus for measuring the deformation of an object. The device utilizes an electrooptical frequency modulator to produce two components from an incident laser beam. A polarization splitter further splits the light into two different frequencies which illuminate a diffraction grating on a stationary object. This device is complicated and expensive, and has no provision for measurement of a moving object such as a rotating shaft.

The literature discloses a capacitive torque sensor consisting of two encoders either mounted perpendicular to the shaft at each end, or mounted circumferentially at two closely placed points along the shaft. See "Interest in Misfire Detection Technology Grows", Automotive Electronics Journal, Nov. 6, 1989, pg 12. Each encoder has two parts: a stator that consists of up to 256 radial fingers that are alternately charged; and a rotor that is mounted on the shaft. As the shaft turns, the rotor's potential switches between positive and negative at a frequency proportional to speed. A disk, in the center of the stator, electrically isolated from the charged fingers collects the signal. Like the optical torque sensor, the twist of the shaft is determined by measuring the phase difference between the two encoders. Also like the optical sensor this device requires exact alignment.

Finally, magnetic torque sensors comprise much of the prior art. The magnetic properties of most ferromagnetic materials change with the application of stress to such an extent that stress may be ranked with field strength and temperature as one of the primary factors affecting magnetic change. Magnetostriction is a measure of the stress sensitivity of a material's magnetic properties. Magnetic based torque sensors take advantage of the magnetostrictive properties of ferromagnetic metals, such as carbon steel. See "Noncontact Magnetic Torque Transducer," Sensors, 11/90, pp. 37–40. These sensors make a contactless measurement of changes of magnetic permeability in shaft materials, which are caused by torsional stress. In place of strain gages, magnetic flux is directed into the shaft and along the helical lines of compression and tension. A positive magnetostriction shaft experiencing torsion will exhibit increased permeability along the line of tension and decreased permeability along the line of compression. At low stress levels the permeability is nearly linear with stress, but varies dramatically at high stress. Another drawback of a magnetostrictive torque sensor is in the need for calibrating it individually with each shaft This requirement is obvious because the torque measurement is made by means of the magnetostrictive properties of the shaft material and cannot be predetermined in the manufacture of the sensor by itself. The variability in magnetostrictive properties is usually correlated with the variability of the mechanical hardness of the material. Hardness variability of shaft materials typically ranges from +10 percent to +40 percent. The shaft-to-shaft variability problem has been addressed in recent research by adding either a sleeve or coating of a well defined and magnetically soft material, such as nickel, permalloy, or ferromagnetic amorphous alloys. While this approach shows promise, installation can not be made in situ, and all magnetic materials, even the softest, can retain some magnetism leading to nonlinearities and drift.

There is a need for an accurate, simple, noncontact sensor for measuring torque in a stationary or rotating shaft.

SUMMARY OF THE INVENTION

The present invention provides means and method for measuring the torque in a rotating or stationary shaft Generally stated, the invention provides an apparatus for measuring torque in a stationary or rotating shaft, comprising: a light source for emitting a light along a light path; a light detector having a plurality of light detecting elements; and a reflection grating provided with grating lines and grating spacing, the reflection grating is fixed to the shaft along the light path for diffracting the light onto the light detecting elements in an alternating pattern of minima and maxima, whereby the torque causes a change in the grating spacing, the change causes different light detecting elements of the light detector to receive the alternating pattern. Preferably, the grating lines of the reflection grating are fixed at an angle of 45° to the length of the shaft. Alternatively, the light detector comprises two light sensitive elements, and the angle of the principle maximum is determined from the relative illumination of the two light sensitive elements.

Further, the invention provides a method for determining the torque on a stationary or rotating shaft using a torque sensor having a light source, a reflection grating and two light detecting elements, the method comprising the steps of: illuminating the reflection grating with a frequency of light from the light source; recording the relative intensity of diffracted light impinging upon the light detecting elements; and determining the angle of the diffracted light from the relative intensity thereof. Alternatively, invention provides a method for determining the torque on a stationary or rotating shaft using a torque sensor having a light source, a reflection grating, and a plurality of light detecting elements, the method comprising the steps of: illuminating the reflection grating with a frequency of light; selecting the individual light detecting element that receives the highest intensity of light diffracted from the reflection grating; and determining the angle associated with the individual light detecting element.

The apparatus of the present invention is simple and rugged, and has excellent sensitivity, accuracy, and linearity. The present invention is an improvement over devices using alternating bands in that present invention requires no alignment, and in the preferred embodiment requires only one grating and associated optics. The present invention is an improvement over previous devices using gratings in that the present invention requires only one light frequency, and it measures torque directly. It is non-contacting, easy to operate and install, and owing to its optical nature, is insensitive to electromagnetic interference.

BRIEF DESCRIPTION OF THE DRAWINGS

The invention will be more fully understood and further advantages will become apparent when reference is made to the following detailed description of the preferred embodiment of the invention and the accompanying drawings, in which.

DESCRIPTION OF THE PREFERRED EMBODIMENTS

Generally, the invention provides a method and means for the measurement of torque on a shaft by monitoring the angle of reflection of light from a reflection grating fixed to the shaft. The method and means of the invention can be practiced and arranged in various ways.

When a ray of light from a source reflects off a surface, its direction is defined by the rule: angle of incidence equals angle of reflection. But if the surface were scribed with narrow, tightly packed grooves, diffraction takes place and interference patterns or fringes are formed in the reflected light. The angular separations of the fringes are determined by the ratio $\lambda/h$, where $\lambda$ is the wavelength of the ray and h, the grating spacing, is the spacing between the centers of adjacent slits. If the incident ray is perpendicular to the grating then the location of the light fringes is determined by:

$$\sin(\theta) = n\,80\,/\,h,$$

where $\theta$, n, $\lambda$, and h are the angle of diffraction, order of diffraction, wavelength, and grating spacing. Taking the differential of both sides, $$d[\sin(\theta)] = d[n\lambda/h],$$

or $\cos(\theta)d\theta = -(n\,\lambda/h^2)\,dh$, giving $$d\theta/dh = -n\lambda/h^2 \cos(\theta).$$

For small changes in diffraction angle with respect to grating spacing, we have:

$$\Delta\theta/\Delta h = -n\lambda/h^2 \cos(\theta),$$

then $$\Delta\theta = -n\,\lambda(\Delta h/h)/h\,\{1-\sin^2(\theta)\}^{1/2},$$

but, $\Delta h/h$ is the strain $\epsilon$ of the grating, so $$\Delta\theta = -n\,\lambda\epsilon/\{h^2-n^2\lambda^2\}^{1/2}.$$

This last expression predicts the change in diffraction angle as the grating undergoes mechanical strain. If the grating spacing increases, the diffraction angle decreases. If the grating spacing decreases, the diffraction angle increases. A diffraction pattern results with n indicating the order of the maxima. The maximum intensity light fringe or principle maximum occurs when n=1.

Figure 1:
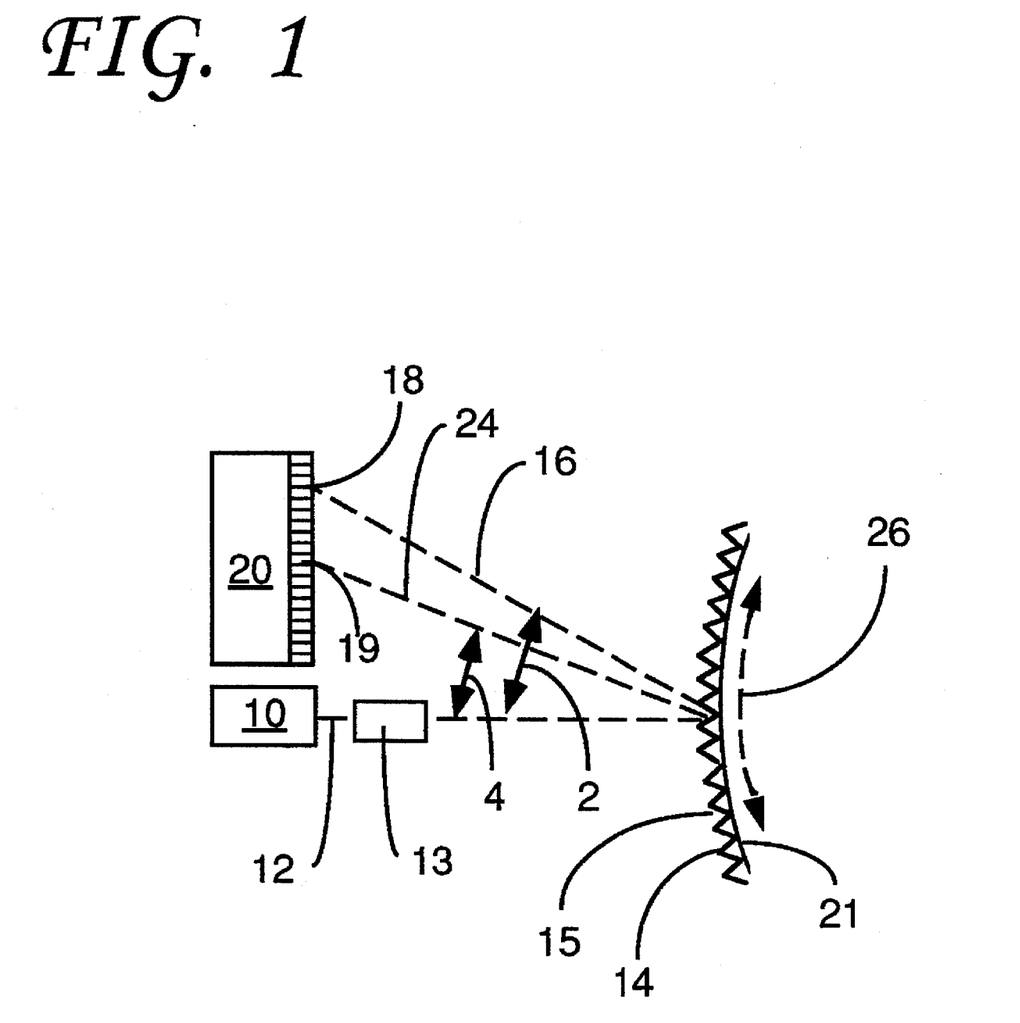
FIG. 1 shows the change in angle of principle maxima due to applied tensile stress on a reflectance grating.

As shown in FIG. 1, grating 14 provided with line spacing 15 is fixed to rotating surface 21. Light ray 12, from light source 10, passes through collimator 13 and then diffracts from grating 14, causing a principle maximum to form as light ray 16 at diffraction angle 2. Light source 10 is a member of a group consisting of a laser, laser diode, light-emitting-diode, and quartz lamp. Light detector 20 comprises a plurality of light detecting elements or multiple element linear array, such as a CCD (charge-coupled-device) array, and charge-injection-device. Light ray 16 illuminates element 18 of light detector 20, thereby detecting the principal maximum. Tensile stress 26 applied to surface 21, causes grating 14 to lengthen and spacing 15 to increase. This increase in line spacing 15 causes the principle maximum to move and diffract along light ray 24 at diffraction angle 4, illuminating element 19 of light detector 20. The angle of diffraction is determined from the position of the illuminated element in the standard way using elementary trigonometry. Alternatively, light detector 20 comprises two light sensitive elements, such as PIN or avalanche type photodiodes, phototransistor, photoresistor, and photocell. In this case, the angle of the principle maximum is determined from the relative illumination of the two light sensitive elements. Specifically, the diffraction angle equals a calibration constant times the difference between the output voltages of the two elements.

Figure 2:
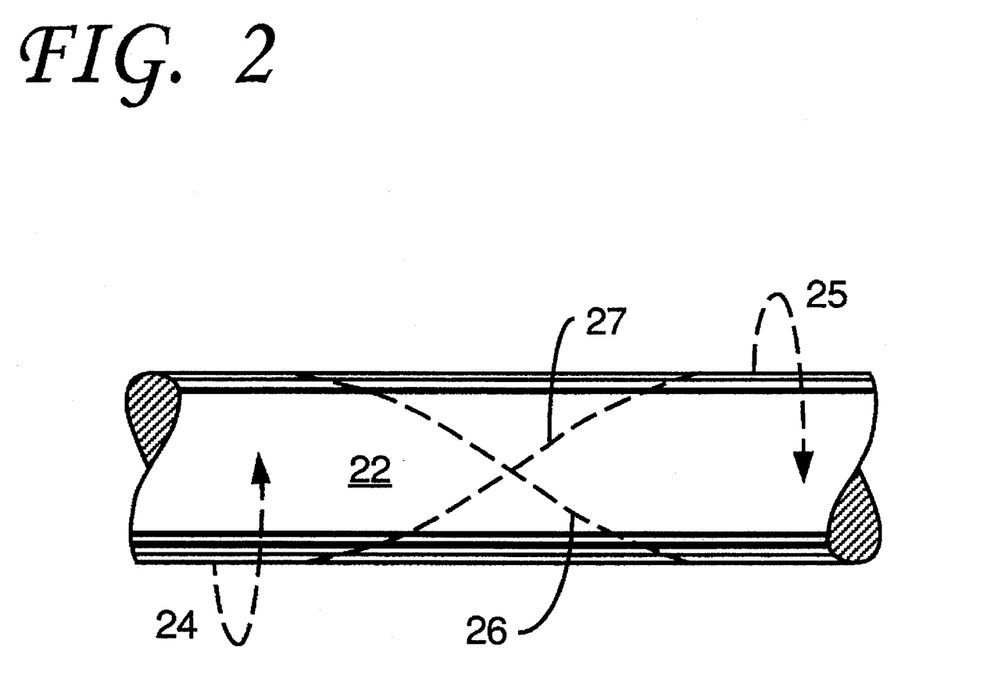
FIG. 2 is a side view of a section of shaft showing induced lines of stress due to applied torque.

When torque, as shown in FIG. 2, caused by twisting moments 24 and 25 is applied to shaft 22, two principal lines of stress 26 and 27 are induced helically, and which are orthogonal to each other, on the surface of shaft 22. Along line of stress 26 shaft 22 experiences tension, while along line of stress 27 the shaft experiences compression.

Figure 3:
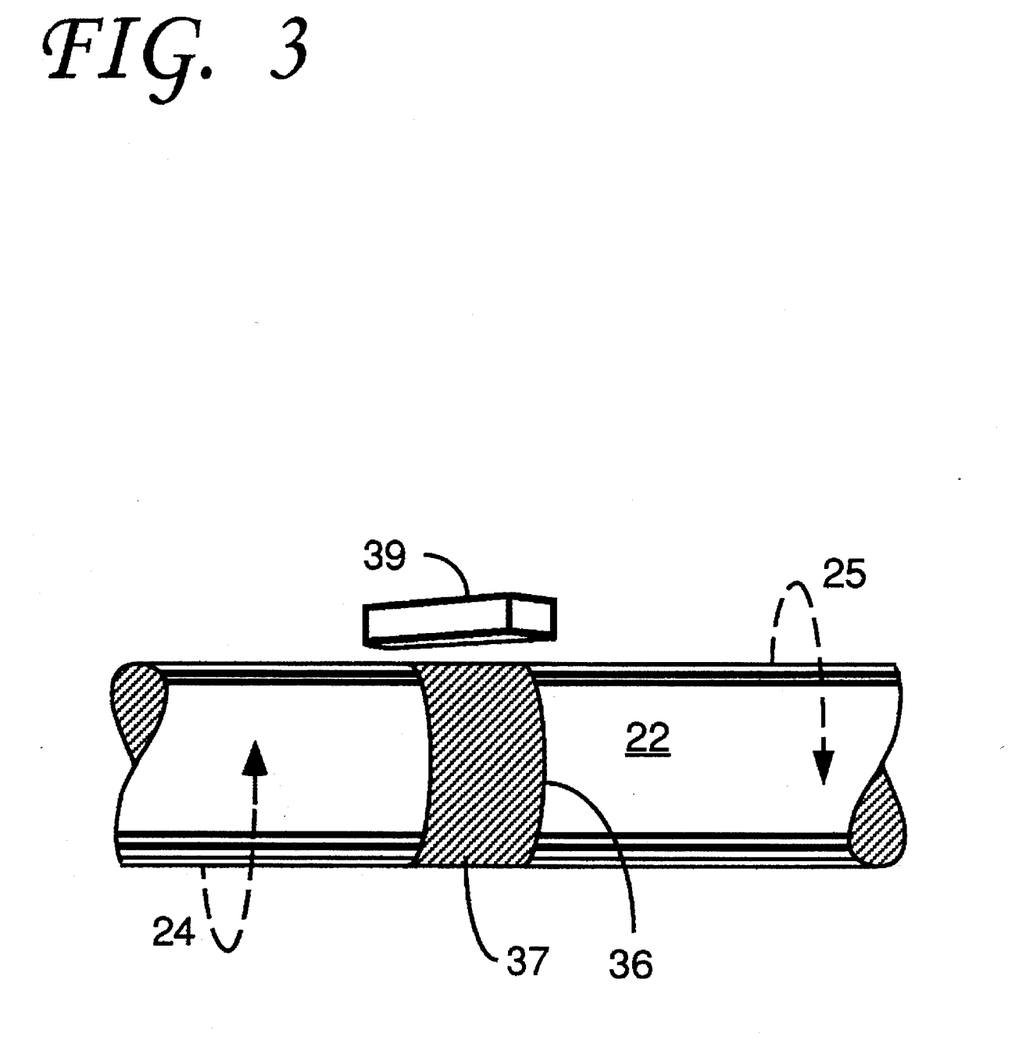
FIG. 3 is a side view of a section of shaft provided with one grating.
Figure 4:
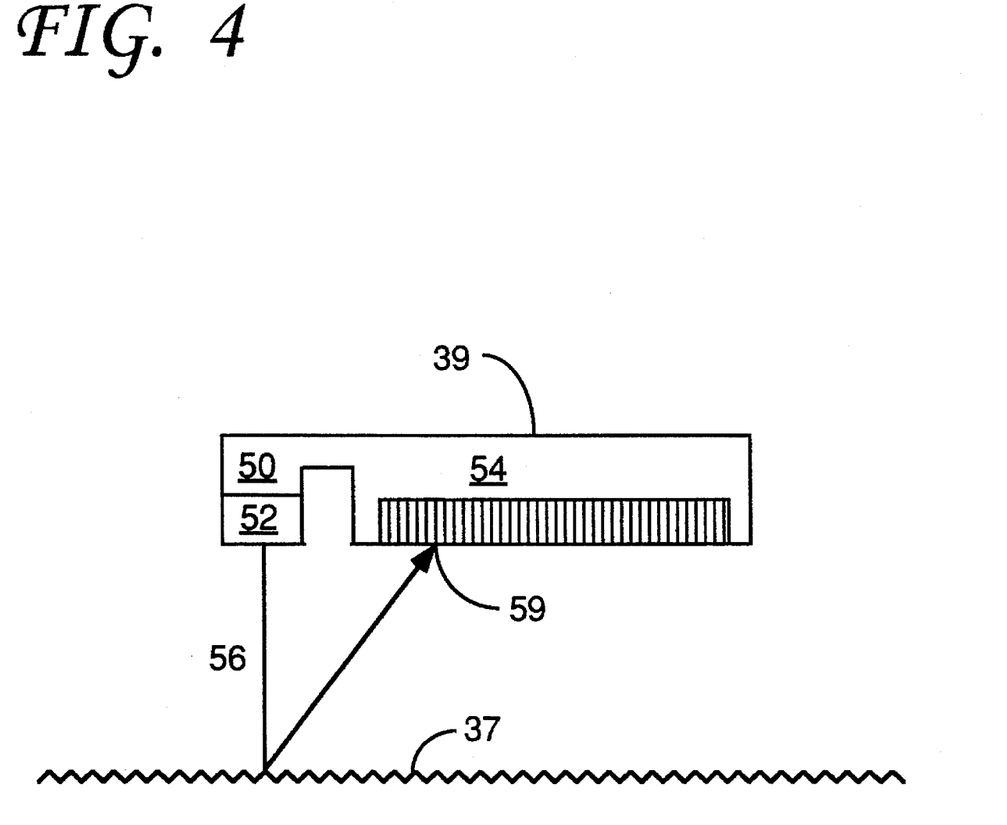
FIG. 4 is a side view of an optical assembly.

Preferably as shown in FIG. 3, a sleeve 36 provided with grating 37 is fixed on shaft 22. Sleeve 36 is slid over the end of shaft 22 during installation. Alternatively, sleeve 36 is split along its length for in situ installation onto shaft 22 by means of adhesive or clamping. As a further alternative, sleeve 36 is eliminated and grating 37 is etched or scribed directly onto shaft 22. Optimal sensitivity is attained when grating 37 is fixed on shaft 22 at 45° with respect to the length of shaft 2.2, such that the groove lengths of grating 37 are set perpendicular to line of stress 26, as shown in FIG. 2, and grating 37 experiences expansion. Alternatively, grating 37 is fixed to shaft 22 such that the groove lengths of grating 37 are set perpendicular to line of stress 27, as shown in FIG. 2, and grating 37 experiences compression. Optical assembly 39, as shown in FIG. 4, is comprised of laser diode 50, collimator 52, and light detector 54. Light ray 56 diffracts from grating 37 into element 59.

Figure 5:
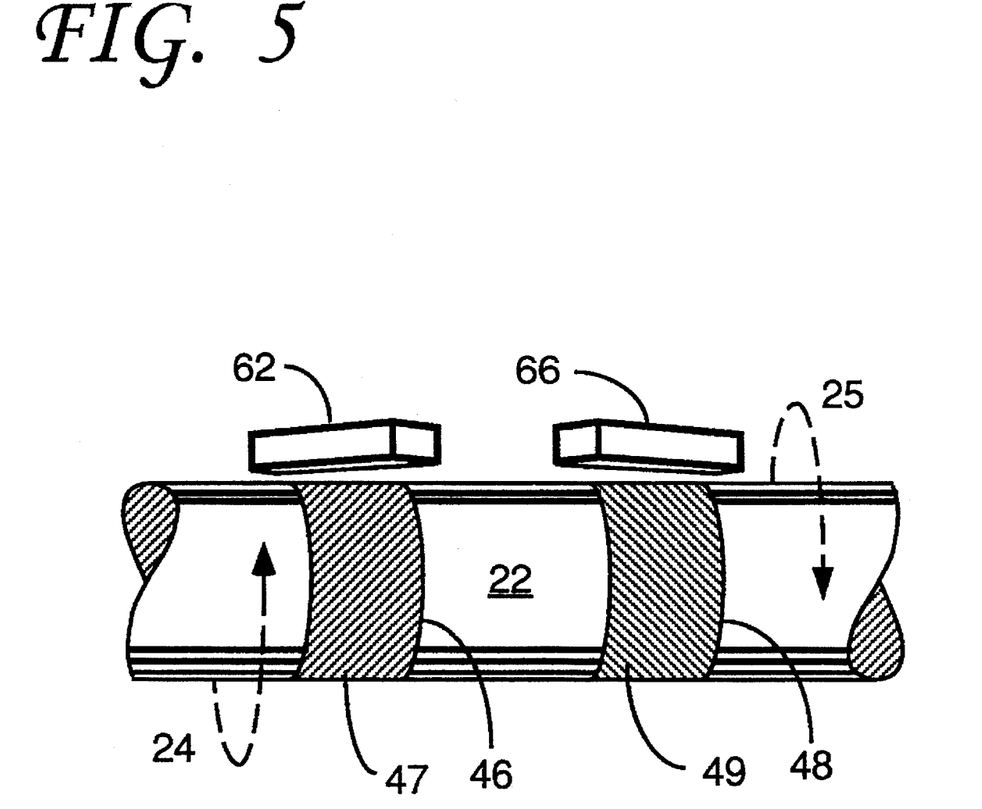
FIG. 5 is a side view of a section of a shaft provided with two gratings
Figure 6:
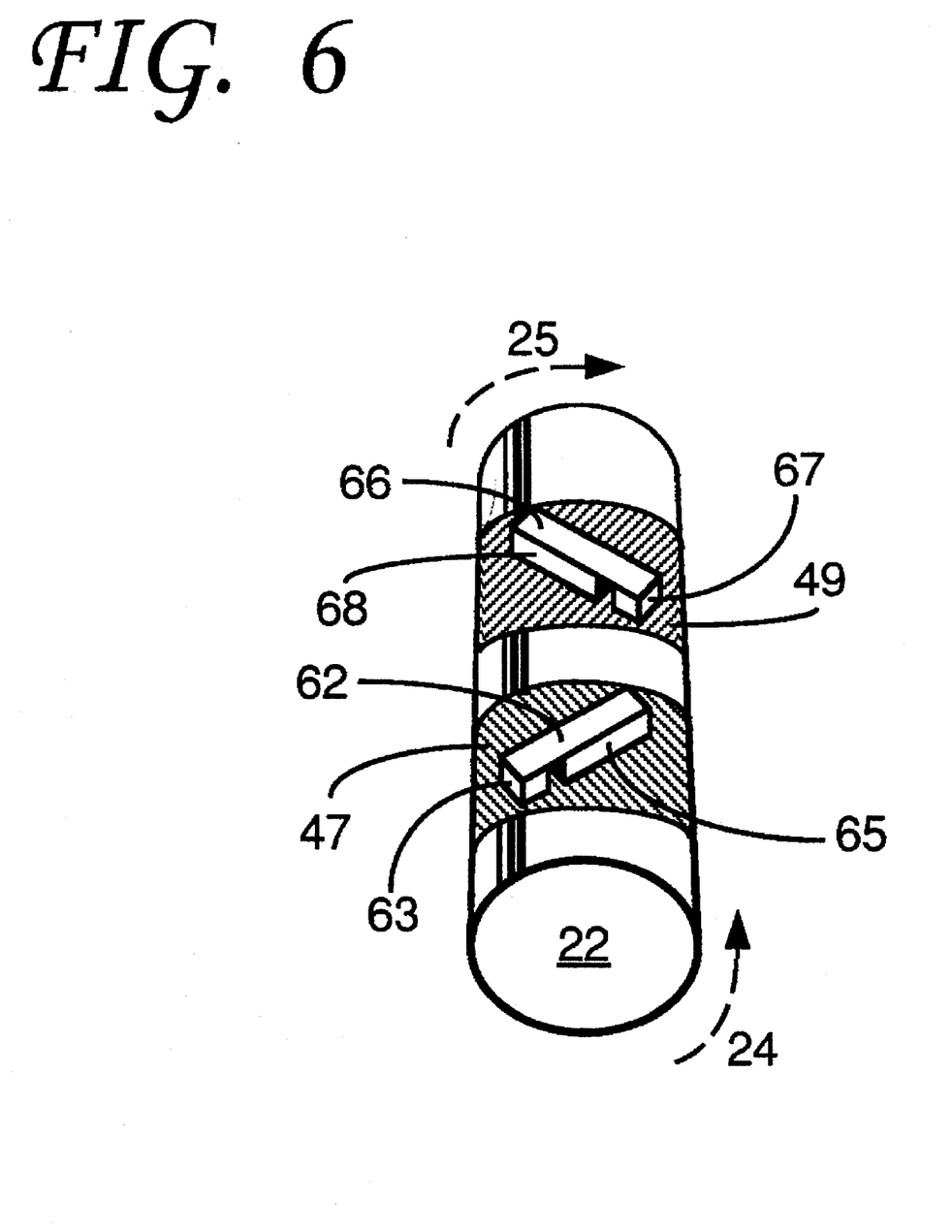
FIG. 6 is a perspective view of a shaft provided with two gratings.

An alternate embodiment is shown in FIG. 5 and FIG. 6. Two gratings are fixed on shaft 22, to improve accuracy and as a fail-safe in case one detector unit become inoperative. First grating 47, on first sleeve 46, is fixed at 45° with respect to the length of shaft 22. Groove lengths of first grating 47 are set perpendicular to line of stress 26, as shown in FIG. 2, and first grating 47 experiences expansion. Second grating 49, on second sleeve 48, is fixed perpendicular to the first grating 47, so that groove lengths of second grating 49 are set perpendicular to line of stress 27, as shown in FIG. 2, and second grating 48 experiences compression. Alternatively, first grating 47 and second grating 49 are fixed on opposite ends of a single sleeve, which is split along its length for in situ installation onto shaft 22 by means of adhesive or clamping. As a further alternative, first grating 47 and second grating 49 are etched or scribed directly onto shaft 22. First optical assembly 62, comprising first light source 63 and first light detector 65, is mounted above first grating 47. Second optical assembly 66, comprising second light source 67 and second light detector 68, is mounted above second grating 49.

Shaft 22 experiences torque caused by twisting moments 24 and 25. First light source 63, supplies the incident rays to first grating 47. Torque increases the grating spacing of first grating 47, and in turn, decreases the diffraction angle of the principal maximum to first light detector 65. Similarly, second light source 67, supplies the incident rays to second grating 49. Torque decreases the grating spacing of second grating 49, and in turn, increases the diffraction angle of the principal maximum to second light detector 68.

Figure 7:
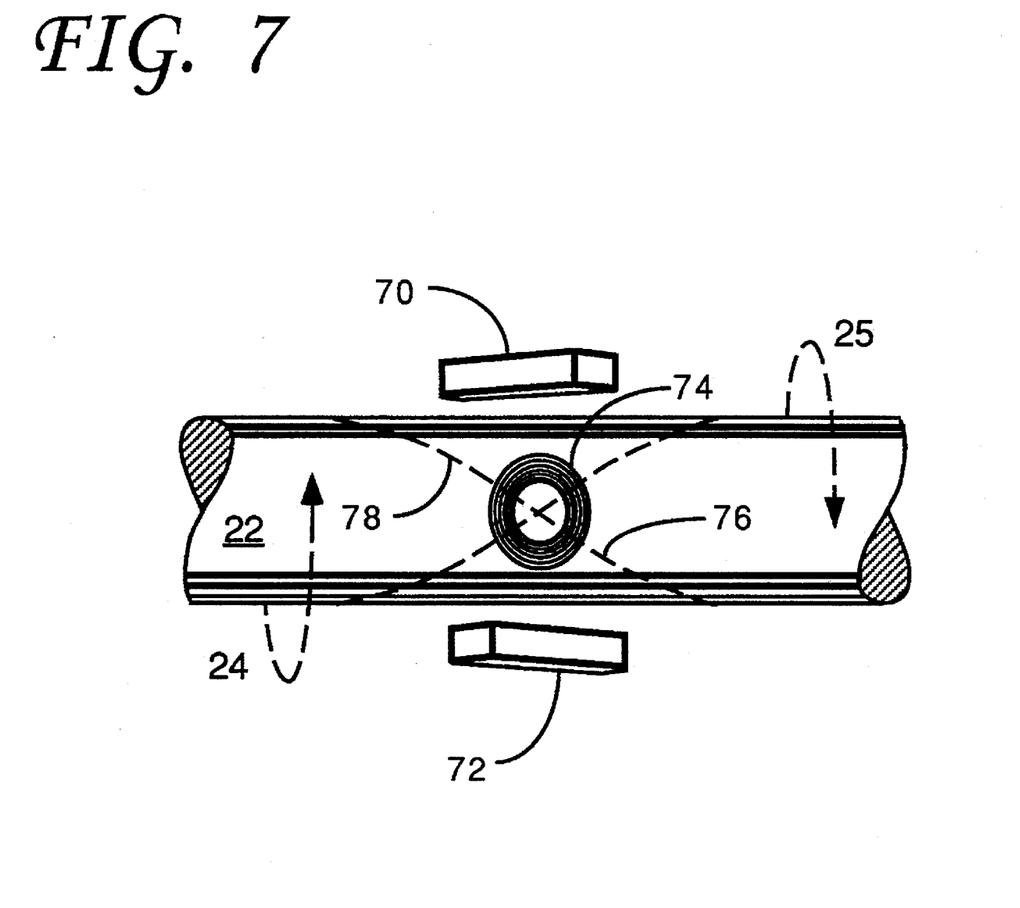
FIG. 7 is a side view of a section of a shaft provided with a circular grating.

Yet a further alternative shown in FIG. 7. The two gratings are replaced with one circular grating 74 fixed to shaft 22. Under twisting moments 24 and 25, circular grating 74 experiences expansion along tension line 78 and compression along compression line 76. Optical assembly 70 measures the expansion of circular grating 74, and optical assembly 72 measures the compression of circular grating 74. In this case, the detected maxima are measured once each revolution rather than continuously as in the previous embodiments.

EXAMPLE

A typical commercial grating, i.e. acetate film, has 5,275 lines/cm or h=1895.7 nm. If we assume a light source of 700 nm, then the first order angle $\theta=21.67°$. A strain of 0.5% yields a change in first order angle of, $$\Delta\theta = -700nm(0.005)/\{(1895.7nm)^2 - (700\ nm)^2\}^{1/2} = -1.987\times10^{-3}\ radians = -0.114$$

But for small $\Delta\theta$, $\Delta d = R\ \Delta\theta$. With R=15 cm, for example, $\Delta d=2.98\times10^{-4}$ m. This is approximately 42 pixels wide for typical commercial 7 μm CCD linear arrays, giving a resolution (1 pixel) of approximately 0.01% strain. In terms of twist angle for 1.27 cm shaft, this is equivalent to $4.30\times10^{-5}$ radians or 0.0025°.

The width of a monochromatic maxima is a function of the resolving power of the grating, r=(angle of first maxima / lines in grating). Assuming the grating has 5000 lines, r=21.67°/5000 lines=$4.33\times10^{-3}$ degrees=$7.56\times 10^{-5}$ radians. Therefore, the resolution error at the detector $\Delta d$,15 cm×$7.56 \times10^{-5}$ radians=11.3 μm, about 1.5 pixels. In terms of twist angle for 1.27 cm shaft, this is equivalent to $6.98\times10^{-5}$ radians or 0.0034°.

In the above example, resolution is increased as the source wavelength is decreased, such as with 550 nm green light.

The apparatus of the present invention is simple and rugged, and has excellent sensitivity, accuracy, and linearity. It requires only one light frequency, it measures torque directly, and in its preferred embodiment, requires only one band attached to the shaft. It is non-contacting, easy to operate and install, and owing to its optical nature, is insensitive to electromagnetic interference.

The invention has been described in detail with particular reference to the preferred embodiments thereof, but it will be understood that additional variations and modifications may suggest themselves to one skilled in the art, all falling within the scope of the invention as defined by the subjoined claims.

What is claimed is:

1. An apparatus for measuring torque on a rotating or stationary shaft under torsion, comprising:

(a) a light source for emitting a light along a light path;

(b) a light detector having a plurality of light detecting elements; and (c) a reflection grating provided with grating lines and grating spacing, said reflection grating being fixed to said shaft along said light path and said grating lines being fixed at an angle of 45° to the length of said shaft, for diffracting said light onto said light detecting elements in an alternating pattern of minima and maxima, whereby said torque causes a change in said grating spacing, said change causes different light detecting elements of said light detector to receive said alternating pattern.

2. An apparatus as recited in claim 1, wherein said apparatus further comprises a means for collimating said light source.

3. An apparatus as recited in claim 1, wherein said light source is selected from the group consisting of laser, laser diode, light emitting diode, and quartz lamp.

4. An apparatus as recited in claim 1, wherein said light detector is selected from the group consisting of charge-injection-device, charge-coupled-device, amorphous silicon device, photodiode, phototransistor, photoresistor, and photocell.

5. An apparatus as recited in claim 1, further comprising:
   (a) a second light source for emitting a second light along a second light path;
   (b) a second light detector having a plurality of light detecting elements; and
   (c) a second reflection grating provided with second grating lines and second grating spacing, said second reflection grating be fixed to said shaft along said second light path and said second grating lines being fixed at an angle of 90° to those of said reflection grating for diffracting said second light onto said second light detecting elements in a second alternating pattern of minima and maxima,
   whereby said torque causes a change in said second grating spacing, said change causes different light detecting elements of said second light detector to receive said second alternating pattern.

6. An apparatus as recited in claim 5, wherein said reflection grating and said second reflection grating are comprised of etched or scribed lines on a sleeve, said sleeve being fixed to said shaft.

7. An apparatus as recited in claim 6 wherein said sleeve has a split along its length, for application in-situ to said shaft.

8. An apparatus as recited in claim 1, wherein said reflection grating is comprised of etched or scribed lines on said shaft.

9. An apparatus as recited in claim 1, wherein said light detector comprises two light sensitive elements.

10. A method for determining the torque on a stationary or rotating shaft using a torque sensor having a light source, a reflection grating having a plurality of grating lines therein and two light detecting elements, said method comprising the steps of:
    (a) fixing said reflection grating to said shaft so that said grating lines are fixed at an angle of 45° to the length thereof;
    (b) illuminating said reflection grating with a frequency of light from said light source;
    (c) recording the relative intensity of diffracted light impinging upon said light detecting elements; and
    (d) determining the angle of said diffracted light from the relative intensity thereof.

11. A method for determining the torque on a stationary or rotating shaft using a torque sensor having a light source, a reflection grating having a plurality of grating lines therein, and a plurality of light detecting elements, said method comprising the steps of:
    (a) fixing said reflection grating to said shaft so that said grating lines are fixed at an angle of 45° to the length thereof,
    (b) illuminating said reflection grating with a frequency of light;
    (c) selecting the individual light detecting element that receives the highest intensity of light diffracted from said reflection grating; and
    (d) determining the angle associated with said individual light detecting element.

* * * * *